Aug. 8, 1972  C. A. HOLLEY  3,682,619
METHOD FOR AGGLOMERATING AND HARDENING METAL OXIDE PELLETS
Filed Feb. 18, 1970  2 Sheets-Sheet 1
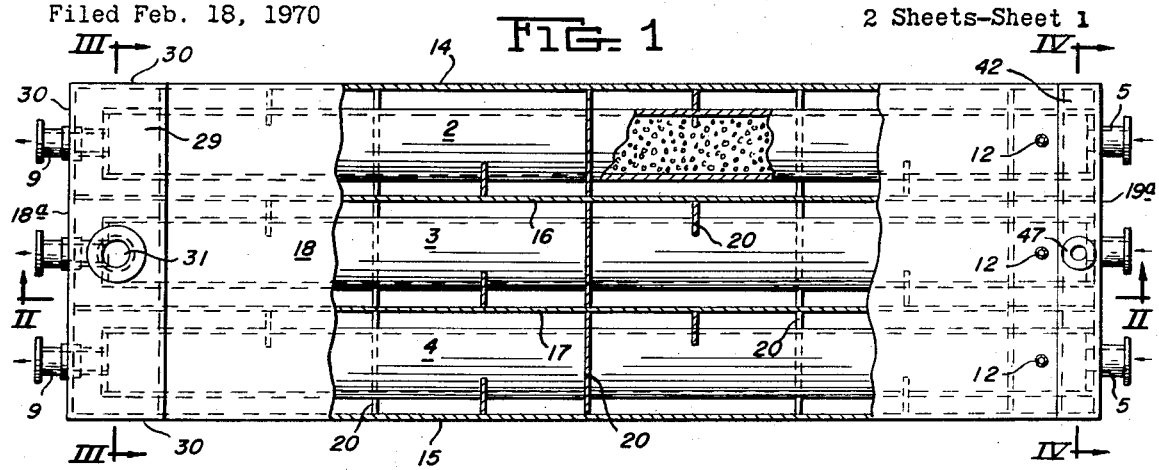
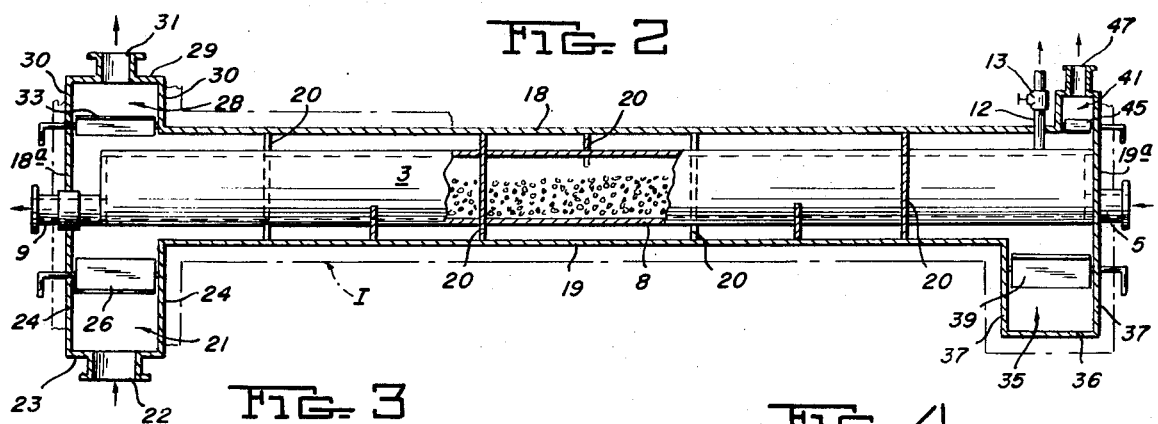
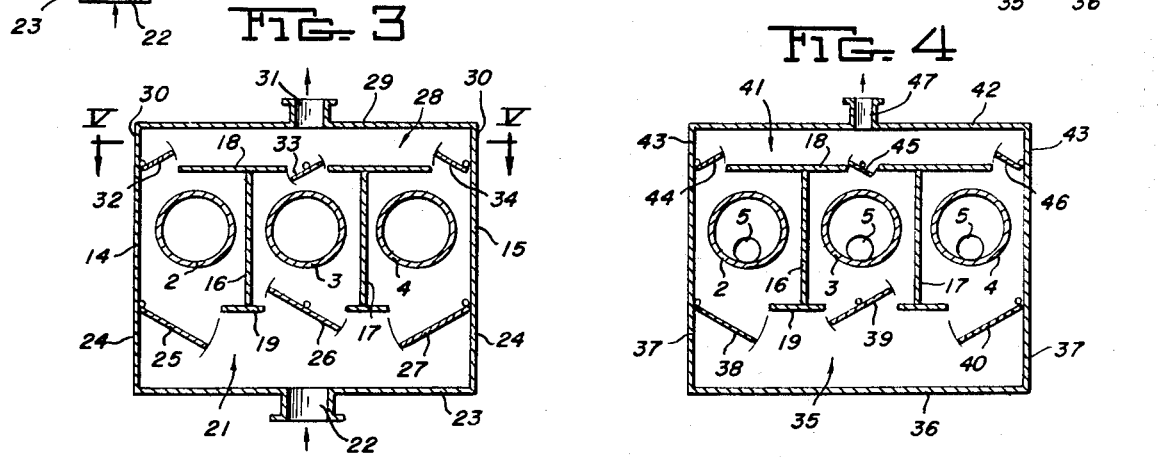
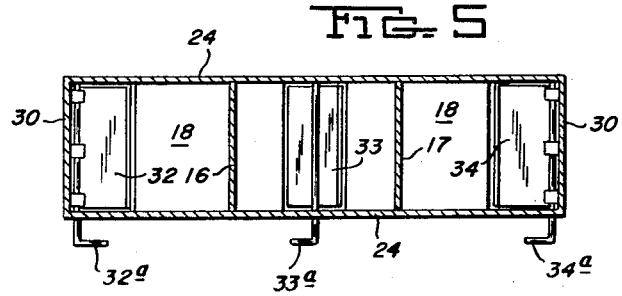
INVENTOR
CARL A. HOLLEY
By Parmelee, Utzler & Welsh
his Attorneys

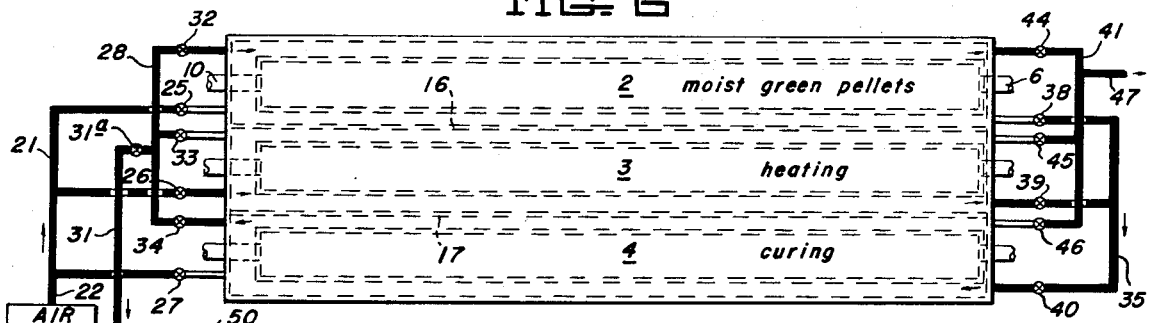
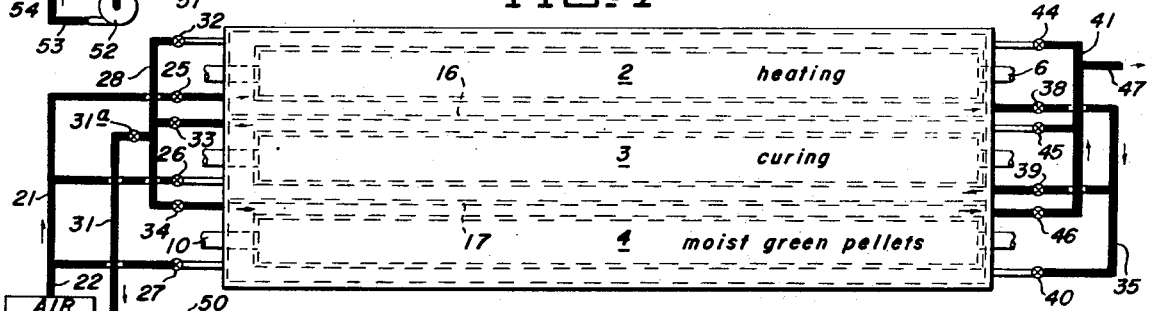
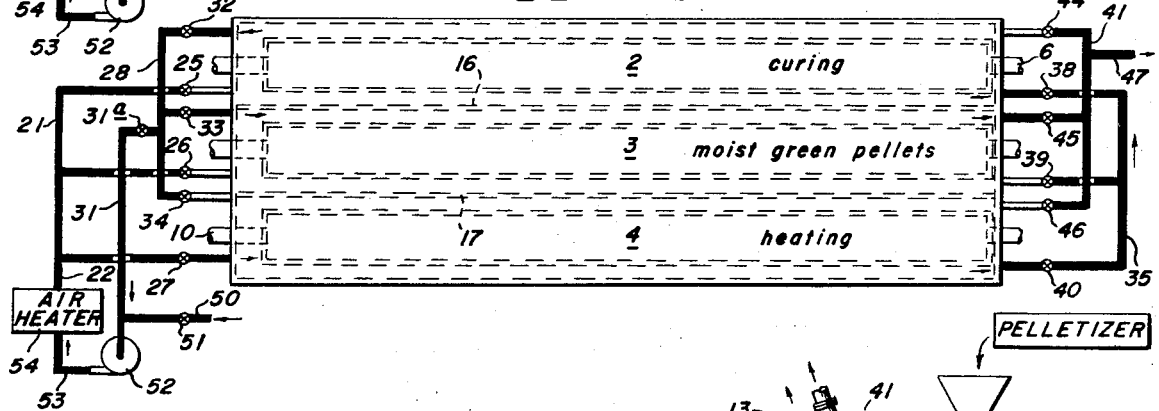
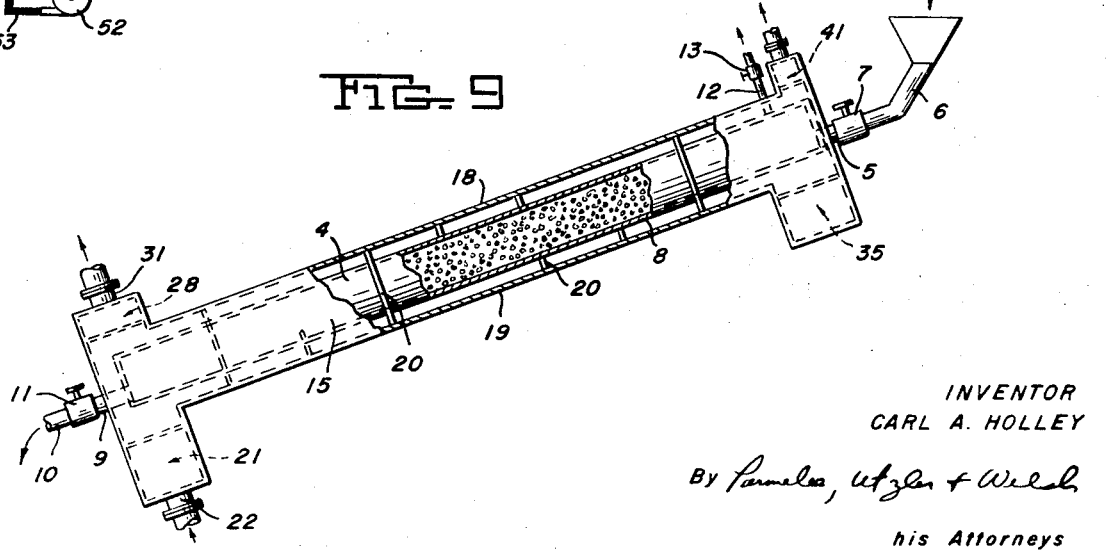

Patented Aug. 8, 1972

3,682,619
METHOD FOR AGGLOMERATING AND HARDENING METAL OXIDE PELLETS
Carl A. Holley, Glenshaw, Pa., assignor to Obenchain Corporation, Pittsburgh, Pa.
Filed Feb. 18, 1970, Ser. No. 12,275
Int. Cl. C21b 1/16; C21d 1/06
U.S. Cl. 75—3    3 Claims

ABSTRACT OF THE DISCLOSURE

An apparatus and process are provided for agglomerating and hardening moist green pellets of a metal oxide containing a cementitious binder, the hardened pellets being formed by a semicontinuous process using heat and pressure to cure the pellets. Moist green pellets containing a cementitious binder are introduced into the upper portion of a preheated inclined pressure vessel, the pellets rolling down the bottom wall of the inclined pressure vessel and the pellet surface dried. The vessel, after filling, is sealed to the atmosphere and the pellets are heated to the desired curing temperature by passing hot gases around the outside of the pressure vessel. Following a sufficient heating and curing time, the pressurized atmosphere, containing steam produced from the moisture in the pellets, is exhausted and the pellets are discharged out of an opening in the lower end of the inclined pressure vessel. Use of a plurality of such pressure vessels provides a semi-continuous process wherein while one pressure vessel is being filled with pellets, a second vessel contains pellets that are being heated to the desired curing temperature and a further pressure vessel which contains pellets that have been heated to the desired temperature is held at the curing temperature to harden the pellets therein. The pressure vessels are contained within heating jackets which are interconnected to a manifold system for circulating hot gases first through the jacket of the vessel which contains the pellets that are to be heated, then through the jacket of the vessel which contains the pellets which are being held at curing temperature, and then, while a portion of the spent gases are recycled, the remainder is fed to the jacket which surrounds the pressure vessel that is being filled with pellets, preheating the vessel and the pellets prior to being exhausted to the atmosphere.

BACKGROUND OF THE INVENTION

Field of the invention

A process and apparatus are described for agglomerating and hardening metal oxides and a cementitious binder into pellets.

Prior art

Numerous processes and apparatus have been provided for the agglomeration of pellets of metal oxides. Some involve large batch autoclaves wherein steam is injected into the autoclave to heat the material therein, while others use rotary kilns or a traveling grate apparatus. Most involve numerous moving parts which are subject to extensive wear due to the high temperatures necessary for the curing of the pellets. A process for agglomerating mineral products under conditions of high temperature and pressure with steam is disclosed in U.S. 3,235,371, wherein ores are mixed with water and a bonding agent such as calcium oxide or magnesium oxide or their hydroxides and an accelerator agent such as an alkaline metal oxide is added to the mixture which is then formed into pellets. The pellets are hardened in a batch-wise process involving charging the pellets and a supply of water to an autoclave and heating the autoclave to harden the pellets under super-atmospheric pressure in the presence of steam.

I have invented an improved process and an apparatus for carrying out the process, in which a metal oxide is pelletized and the pellets dried and hardened in a semi-continuous process involving forming a mixture of a cementitious binder and a metal oxide, pelletizing the mixture with added water and hardening the green moist pellets within a pressure vessel wherein the pellets remain in discrete form. The process and apparatus are especially adaptable to formation of hardened pellets of an iron oxide in the form of plant wastes, such as various metallurgical dusts that may contain coke breeze or other contaminants.

BRIEF SUMMARY OF THE INVENTION

An apparatus and method are provided for agglomerating and curing moist green pellets of a metal oxide, the pellets containing a cementitious binder and being surface dried prior to curing. Moist green pellets of metal oxide are formed in a pelletizer with a cementitious material such as Portland cement and the pellets charged through an inlet of a preheated inclined pressure vessel. The pellets, on being introduced to the inclined pressure vessel, which has been heated externally by the flow of hot gases through a jacket in which the pressure vessel is enclosed, roll along the bottom wall of the vessel. The rolling action along the heated wall dries the surface of the moist green pellets and prevents clumping of the pellets. With the discharge valve at the lower end of the inclined vessel closed, a quantity of pellets will be retained in the vessel. When a predetermined amount of pellets is present in the vessel, the vessel is sealed and the temperature within the vessel increased by passing hotter gases through the surrounding jacket. Water present in the pellets vaporizes to steam and the pellets are cured within the steam saturated pressurized atmosphere. Following a time sufficient to cure the pellets, the vessel is opened to the atmosphere and the discharge valve at the lower end of the vessel is opened to permit the cured pellets to roll by gravity from the vessel. The preferred embodiment of the apparatus comprises a plurality of inclined pressure vessels in jackets that have an interconnecting manifold system arranged to carry a flow of hot gases through the jacket containing a vessel wherein pellets are being heated, thence through the jacket containing a vessel wherein pellets are being cured and finally through the jacket containing a vessel which is being filled with pellets. Successive operation of the plurality of vessels provides a semi-continuous operation for drying and hardening the pellets.

BRIEF DESCRIPTION OF THE DRAWINGS

FIG. 1 is a top plan view of an apparatus according to the present invention with a cutaway portion to show three pressure vessels arranged for semi-continuous operation;

FIG. 2 is a view taken along the plane of lines II—II of FIG. 1 showing a cutaway portion of the interior of the vessel;

FIG. 3 is a view taken along the plane of lines III—III of FIG. 1, illustrating the lower end of the inclined apparatus;

FIG. 4 is a view taken along the plane of lines IV—IV of FIG. 1 showing the upper end of the inclined apparatus;

FIG. 5 is a view taken along lines V—V of FIG. 3;

FIG. 6 is a schematic diagram illustrating flow of hot gases through the apparatus of FIG. 1 to effect one phase of the semi-continuous process of the present invention;

FIG. 7 is a schematic diagram illustrating flow of hot gases through the apparatus of FIG. 1 to effect another phase of the semi-continuous process of the present invention;

FIG. 8 is a schematic diagram illustrating the flow of hot gases through the apparatus of FIG. 1 to effect a further phase of the semi-continuous process of the present invention; and FIG. 9 is an illustration of the inclined position of the apparatus of the present invention showing the position of charging and discharging means on the vessel with an associated pelletizer graphically illustrated.

DETAILED DESCRIPTION

The present apparatus and process provide for the semicontinuous hardening of moist green pellets of a metal oxide. As illustrated in the drawings, the apparatus comprises a plurality of inclined pressure vessels that are enclosed within heating jackets, having a manifold system for directing hot gases through the jackets to externally heat the vessels. Referring to FIG. 1, a plurality of pressure vessels herein illustrated as tubular vessels 2, 3 and 4 are provided, each vessel being positioned at an angle of about 15 to 30 degrees to the horizontal, from the upper end, at the right of the drawing and directed downwardly, that is in the direction of the left hand side of the drawing. Each vessel has at its upper end, an inlet 5 through which moist green pellets are introduced into the pressure vessel. Connected to the inlet 5 of each vessel is a conduit or line 6 (FIG. 9) which contains therein a valve 7 that is used to regulate the rate of introduction of moist green pellets into the pressure vessel and also to seal the upper end of the vessel to the atmosphere during the pressurized treatment of the pellets contained therein. At the lower end of each pressure vessel, at a position adjacent the bottom wall 8 of the vessel there is provided an outlet 9 through which hardened pellets are discharged from the vessel. Each outlet 9 is connected to a discharge line or conduit 10 having a valve 11 therein (FIG. 9) which is used to regulate the discharge of pellets from the pressure vessel and also to seal the lower end of the vessel to the atmosphere during pressurized treatment of the pellets contained in the vessel. Each pressure vessel is provided, at a position adjacent the upper end thereof, with a pressure release line 12, which contains a valve 13, for releasing pressure from the vessel following the desired pressurized treatment of the pellets and prior to discharge of the pellets from the vessel.

The pressure vessels are contained within heating jackets through which hot gases are passed to externally heat the vessel and the pellets contained therein. As illustrated, the heating jacket comprises outer walls 14 and 15, with partitions 16 and 17 provided on opposed sides of the central pressure vessel 3, to provide side walls of a jacket, with a common upper wall 18 and common lower wall 19 provided. Common end walls 18a and 19a are also provided and each pressure vessel is thus contained within a separate heating jacket. The pressure vessels are maintained in each jacket by means of braces 20 which are provided at alternating positions around each of the pressure vessels, whereby the vessel will be maintained within the jacket spaced from the jacket walls while the flow of hot gases from one end of the jacket to the other end will not be interrupted. The positioning of the braces is readily seen in FIG. 2 which shows the alternating positioning of the braces 20 to permit the flow of hot gases through the jacket surrounding pressure vessel 3. The alternating position of the braces 20 also effect a turbulent flow of the hot gases through the chamber and around the vessel, giving a spiral-type flow from one end of a vessel to the other and to provide efficient heating of the vessel.

At the lower end of the apparatus, attached to the bottom wall 19, is a chamber of feed manifold 21 which has a port 22 for the introduction of hot gases into the chamber. The chamber 21 has a bottom wall 23 which, with side and end walls 24, form a chamber which extends the entire width of the three jackets enclosing vessels 2, 3 and 4. The top wall of the chamber 21 is formed by common bottom wall 19 of the jackets, and has gates or dampers which connect the chamber with each of the jackets (FIG. 3). Gate 25 opens from chamber 21 into the jacket surrounding vessel 2, gate 26 opens into the jacket surrounding vessel 3 and gate 27 opens into the jacket surrounding vessel 4. A similar chamber 28 is provided connected to the top wall 18 at the lower end of the apparatus, the chamber having a top wall 29 and side and end walls 30. The top wall 29 has an exit line 31 through which gases are exhausted from the chamber 28, the line 31 containing a valve 31a (not shown) for regulation of the gas exited through line 31. Gates are provided in the top wall 18, opening from the chamber 28 into the various jackets surrounding vessels 2, 3 and 4, with gate 32 opening into the jacket surrounding vessel 2, gate 33 opening into the jacket surrounding vessel 3 and gate 34 opening into the jacket surrounding vessel 4. A further chamber is provided connected to the bottom wall 19 at the upper end of the apparatus (FIG. 4), this chamber 35 having a bottom wall 36 and side and end walls 37. A series of gates 38, 39 and 40 are provided in the common bottom wall 19 interconnecting the various jackets surrounding pressure vessels 2, 3 and 4 with the chamber 35, this chamber being used to distribute hot gases from one jacket to another jacket. The top wall 18 is, at the upper end of the apparatus, interconnected to an exhaust chamber 41 which has a top wall 42 and side and end walls 43, with gates 44, 45 and 46 interconnecting this chamber with the various jackets surrounding pressure vessels 2, 3 and 4. The top wall 42 of chamber 41 has an exit line 47 for the exhausting of spent gases to the atmosphere. The functioning of the various manifold chambers 21, 28, 35 and 41 and the gates interconnecting these chambers with the various jackets surrounding pressure vessels 2, 3 and 4 is best explained by reference to FIGS. 6 through 8, wherein the operation of these components is schematically illustrated and is hereinafter described in detail. As illustrated in FIG. 5, the various gates can have handles thereon, such as handles 32a, 33a and 34a on gates 32, 33 and 34 for manual opening or closing of the gates, or mechanical or electrical means can be used for automatic operation.

Prior to examination of the functioning of the plurality of vessels, it is best to examine the operation of one such vessel during the drying and hardening of a batch of moist green pellets. Moist green pellets are formed in a pelletizer such as a drum or disc pelletizer (FIG. 9) of conventional design, in which a metal oxide in finely divided state, a cementitious material and water is combined and the metal oxide rolled into balls or pellets. The metal oxide may be an iron ore concentrate or solid steel plant wastes such as mill scale, blast furnace dust or dust resulting from steel making processes such as BOF dust, open hearth dust or electric furnace dust. These plant wastes may also include coke breeze, dust screened from pellets and dust screened from lime or limestone and fine coal.

The metal oxide is combined with a cementitious material such as portland cement, slag cement, pozzalanic cement or hydraulic lime which serves as a binder. The various materials are preferably ground separately to a fine state suitable for pelletizing and added together in their finely divided state. The degree of fineness of the particles needed for pelletizing is known to those skilled in the pelletizing art and is generally on the order of about a particle size such that about fifty percent of the particles pass through a 325 mesh seive while the particles are not retained on a 40 mesh screen.

The amount of portland cement or other cementitious material added to the metal oxide will vary depending upon the calcium oxide, magnesium oxide and silicon dioxide that may be present in the metal oxide where mill wastes are used. Generally, an amount within a range of about 5–15% by weight based on the metal oxide, of the cementitious material is added.

In the pelletizing of the metal oxide and the cementitious material to form nodules or balls, water is added to the finely ground mixture. About 6–12% by weight of water is used with about 8% water being generally sufficient. A minimum amount of water needed to form a strong pellet is preferred.

The pellets, of a conventional size of between about 3/8–5/8 inch in diameter, containing metal oxide, cementitious material and water are charged into line 6, and with the valve 7 open, the pellets will enter the pressure vessel through inlet 5 and through the positioning of the pressure vessel in an inclined position relative to the horizontal, the pellets roll by gravity along the bottom wall 8 of the vessel until they reach the lower end of the vessel. With valve 11 in discharge line 10 being closed, the pellets build up in the pressure vessel until the vessel is either filled or a predetermined amount of pellets is contained therein. The pellets in the vessel remain as distinct pellets and do not agglomerate or clump together because of the drying action upon the surface of the pellets which results from the pellets rolling along the bottom wall 8 of the vessel, the vessel having been preheated by the external flow of hot gases. When a predetermined amount by pellets is present in the vessel, and with valve 11 remaining closed, valve 7 in the inlet line 6 and valve 13 in the pressure release line 12 are closed. Closing of these valves seals the contents of the pressure vessel to the atmosphere and the interior of the vessel, because of the external heating of the vessel, becomes saturated with steam from the moist pellets. After the pressure vessel is sealed, hotter gases are passed around the outside of the vessel through the jacket and the temperature of the pellets is increased to the desired temperature for effecting hardening of the pellets containing the cementitious material. After the interior of the vessel has reached the predetermined temperature for hardening and curing, the pellets are held for a sufficient amount of time within the high temperature pressurized vessel in order to harden them. The vessel and the pellets contained therein are heated to a temperature of between about 300–500° F. to cure the pellets, at which temperature the pressure within the closed vessel is between about 100–600 pounds per square inch, the specific temperature used determining the resultant pressure. For example, at a temperature of about 422° F., the pressure within the closed vessel will be about 300 p.s.i.g. The only heat supplied is that which is externally applied to the vessel by hot gases through the heating jacket and the heat of hydration, that heat resulting from the exothermic setting of the cementitious material in the pellets. After a sufficient curing time, between about 5–60 minutes for pressure between 200–500 p.s.i.g., valve 13 in pressure release line 12 is opened to de-pressurize the vessel, and, in order to discharge the hardened pellets from the vessel, the valve 11 in discharge line 10 is opened, following which the hardened pellets will roll by gravity from the vessel.

Hardened pellets of about 1/2 inch diameter have been produced according to the present process, the pellets formed from a mixture containing one-third BOF dust and two-thirds mill scale. The mixture had added thereto 9% by weight portland cement and about 8% by weight water. The pellets were agglomerated in a conventional pelletizer and cured in a pressure vessel at a temperature of 422° F. and a pressure of 300 p.s.i.g., for a period of 50 minutes. The hardened pellets, had a compression test reading of 509 pounds on a compression meter apparatus (Soil Test Inc.-Model No. U–162).

By utilizing a plurality of pressure vessels and a manifold system for the direction of the hot gases through jackets surrounding the vessels, a semi-continuous process for hardening of moist green pellets is achieved. With three such vessels, as illustrated in the schematic diagrams of FIGS. 6, 7 and 8, while one vessel is being filled, with moist green pellets, a second vessel, which has been filled, can be heated to the desired curing temperature, while a third vessel which has previously been filled and heated, can be held at curing temperature and pressure conditions to cure the pellets.

Referring to FIG. 6, the schematic diagram illustrates the position of the various gates and valves for a phase of the semi-continuous operation of the apparatus wherein pressure vessel 2 is being filled with pellets, pressure vessel 3 has pellets contained there in and is being subjected to heating, while pressure vessel 4 contains previously heated pellets which are being subjected to curing. For this phase of the operation, valves 25, 33 and 27 are in closed position at the lower end of the pressure vessel while valves 32, 31a, 26, 34 and 51 are in open position. Valve 51 is positioned within a line 50 which is connected to a source of hot gases or air (not shown). At the upper end of the pressure vessel, valves 38, 45 and 46 are in closed position, while the open valves at the upper end of the apparatus for this phase of the operation are valves 44, 39 and 40. In this phase of the operation, hot gases are introduced through valve 51 of line 50 to a fan or other circulating means 52 which passes the gases through line 53 into a heater 54. From the heater 54, the hot gases pass through line 22 into the manifold system or chamber 21. With valves 25 and 27 closed, the hot gases pass through valve 26 into the jacket surrounding pressure vessel 3. The hot gases flow through the jacket surrounding pressure vessel 3 and exit through valve 39 into recycle manifold or chamber 35. With valve 38 closed, the hot gases from the jacket surrounding the vessel 3 pass through open valve 40 into the jacket surrounding pressure vessel 4 and flow downwardly to the lower end of the apparatus. The hot gases exit from the jacket surrounding pressure vessel 4 through valve 34 and into chamber or manifold system 28. Valve 31 is interconnected with the manifold system 28, and while a portion of the hot gases flow through valve 31a, and through line 31 to return for recycle to fan 52, the remainder of the hot gases exhausted from the jacket surrounding pressure vessel 4 are fed from the manifold 28 through open valve 32 and into the jacket which surrounds pressure vessel 2. These gases which have lost some sensible heat are used to preheat the vessel 2 and heat the pellets as they are being introduced into the vessel. After passing through the jacket which surrounds vessel 2, the gases are finally exited through valve 44 into the chamber 41 and are then exited to the atmosphere through line 47. It can be seen that with this construction, the gases, while in their hottest state, are passed around the pressure vessel 3 so as to heat the pellets to the desired temperature, and are then passed through the jacket which contains the vessel holding the hot pellets which are being cured, which requires less sensible heat then does heating of the cold pellets up to their desired temperature. Following passage around the vessel which contains pellets which are being cured, a portion of the hot gases are recycled while the remaining portion of the hot gases are used to preheat the vessel 2 which is being filled with pellets and the spent gases then exhausted to the air.

After a predetermined time, the pellets within the vessel 4 are cured, the pellets in vessel 3 are heated to the desired temperature for curing and the vessel 2 is filled with a predetermined amount of pellets. The valves are then actuated into position as shown in FIG. 7 and the hot gases are circulated as follows. With valves 32, 26, and 27 closed at the lower end of the vessel, while valves 31a, 25, 33, 34 and 51 are open, the valves at the upper end of the vessel, valves 44, 45 and 40, are closed and valves 38, 39 and 46 placed into open position. With the various valves in these positions, hot air or gases pass from the air heater 54 through line 22 into the manifold 21 and are directed through open valve 25 into the jacket surrounding pressure vessel 2, which has been filled with pellets and which pellets are now to be heated to curing temperature. The gases, which are at their hottest temperature at this point, are exited from the jacket surrounding pressure vessel 2 through valve 38 and into manifold 35, which directs the hot gases through open valve 39 and into the jacket surrounding pressure vessel 3, which contains pellets which have been heated and are now being held at elevated temperature for curing. From the jacket surrounding pressure vessel 3 the gases are exited through valve 33 into manifold 28. A portion of the gases are exhausted through valve 31a for recycle while the remainder is directed through open valve 34 into the jacket surrounding pressure vessel 4. At this stage, the cured pellets in pressure vessel 4 from phase one (FIG. 6) have been discharged and the pressure vessel 4 is being filled with a fresh supply of moist green pellets, these pellets being preheated by the gases which pass through valve 34 into the jacket surrounding pressure vessel 4. The gases are finally exited through valve 46 and into chamber 41 for discharge to the atmosphere. In this phase of the operation, pellets in pressure vessel 2 are being heated while pellets in pressure vessel 3 are being held at curing temperature and fresh pellets are being fed to pressure vessel 4 and preheated for subsequent heating and curing.

The third phase illustrated in schematic FIG. 8, shows, at the lower end of the apparatus, valves 32, 31a, 33 and 27 in open position while valves 25, 26, 34 are closed. At the upper end of the vessel, valves 44, 39 and 46 are closed while valves 38, 45 and 40 are in open position. With the valves in these positions, hot gases from the heater 54 pass through line 22 into manifold 21 and are directed through valve 27 into the jacket surrounding pressure vessel 4, which has just been filled with moist green pellets and sealed. These hot gases heat the pressure vessel 4 and its contents and are exited through valve 40 into the manifold 35 and directed through open valve 38 into the jacket surrounding pressure vessel 2. The pellets within pressure vessel 2, have, in the previous sequence, been heated and are now to be subjected to curing conditions. Hot gases from the jacket surrounding pressure vessel 2 are exited through valve 32 into manifold 28 and a portion exhausted through valve 31a for recycle, the remainder being directed through open valve 33 into the jacket surrounding pressure vessel 3. The gases are finally exited from the jacket surrounding pressure vessel 3 through valve 45 to chamber 41 and then to the atmosphere.

It can be seen by reference to the schematic drawings that, with three vessels, at all times one pressure vessel is being filled with moist green pellets while being preheated with spent hot gases, while a second vessel is sealed and being heated to curing temperature and a third vessel containing pellets which have been heated is being held at a high temperature for curing of the pellets.

I claim:
1. Process for agglomerating and hardening green pellets of a metal oxide in a steam-saturated atmosphere under super-atmospheric pressure comprising:
   (a) forming green pellets of a metal oxide, the pellets containing about 5–15% by weight of a cementitious binder and 6–12% by weight of water,
   (b) charging the formed green pellets into a preheated pressure vessel at a predetermined rate so that the surface of the charged pellets is dried and hardened as the pellets are charged into the pressure vessel whereby the pellets do not agglomerate together,
   (c) sealing said charged pressure vessel to the atmosphere and heating the pellets in said pressure vessel to a temperature of 300–500° F. whereby the water in said pellets is vaporized to form a steam-saturated atmosphere at a pressure of 100–600 pounds per square inch within the pressure vessel,
   (d) maintaining the pellets within the pressure vessel for from about 5–60 minutes to complete the hardening of the pellets,
   (e) venting the pressure vessel to the atmosphere to remove the pressurized steam therefrom, and
   (f) discharging the hardened pellets from the pressure vessel.

2. A process for agglomerating and hardening green pellets of a metal oxide as defined in claim 1 wherein said cementitious binder is selected from portland cement, slag cement pozzalanic cement and hydraulic lime.

3. A process for agglomerating and hardening green pellets of a metal oxide as defined in claim 1 wherein said metal oxide is an iron oxide.

References Cited
UNITED STATES PATENTS

| | | | |
|---|---|---|---|
| 859,411 | 7/1907 | Schumacher | 75—3 |
| 3,490,895 | 1/1970 | Svensson | 75—3 |
| 1,394,949 | 10/1921 | Stearns | 106—97 X |
| 3,447,937 | 6/1969 | Hersey et al. | 106—97 X |
| 833,005 | 10/1906 | Steinberg | 75—3 |
| 3,353,952 | 11/1967 | Hansen | 75—3 |

ALLEN B. CURTIS, Primary Examiner

U.S. Cl. X.R.

266—9